United States Patent [19]
Lamberg

[11] Patent Number: 6,039,515
[45] Date of Patent: Mar. 21, 2000

[54] DRILL HAVING RADIALLY OVERLAPPING INDEXABLE CUTTING INSERTS

[75] Inventor: Fredrik Lamberg, Linköping, Sweden

[73] Assignee: Seco Tools AB, Fagersta, Sweden

[21] Appl. No.: 09/069,764

[22] Filed: Apr. 30, 1998

[30] Foreign Application Priority Data

Apr. 30, 1997 [SE] Sweden .................................. 9701664

[51] Int. Cl.[7] .................................................. B23B 51/02
[52] U.S. Cl. ......................... 408/188; 407/113; 408/224; 408/713
[58] Field of Search ..................... 408/187, 188, 408/189, 223, 224, 713; 407/113

[56] References Cited

U.S. PATENT DOCUMENTS

| | | | |
|---|---|---|---|
| 4,278,373 | 7/1981 | Wolfe, III | 408/188 |
| 4,367,991 | 1/1983 | Grafe et al. | 408/713 |
| 4,659,264 | 4/1987 | Friedline | 408/713 |
| 4,681,488 | 7/1987 | Markusson | 407/113 |
| 4,844,669 | 7/1989 | Tsujimura et al. | 408/188 |

*Primary Examiner*—Daniel W. Howell
*Attorney, Agent, or Firm*—Burns, Doane, Swecker & Mathis, L.L.P.

[57] ABSTRACT

A drill includes a shank, a central insert and a peripheral insert. The shank defines a central axis of rotation and has pockets which carry the peripheral and central inserts. Chip flutes are formed in an outer periphery of the shank for conducting chips cut by the respective inserts. The peripheral insert includes a first operative cutting edge, and the central insert includes a second operative cutting edge which overlaps the first cutting edge at an overlap region. The central insert forms a rake surface adjacent to the second cutting edge. The rake surface includes a first portion disposed at the overlap region, and a second portion disposed at the axis of rotation of the shank. The first portion has a larger rake angle than the second portion.

8 Claims, 5 Drawing Sheets

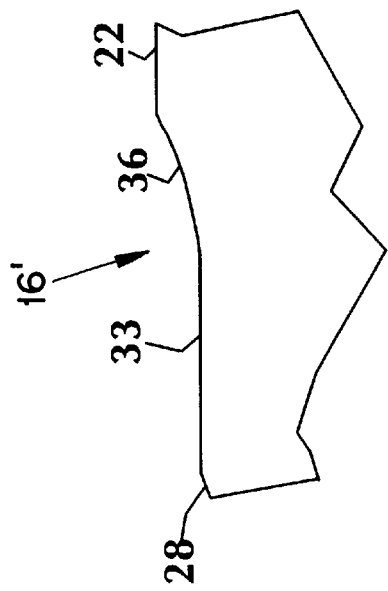
Fig. 9
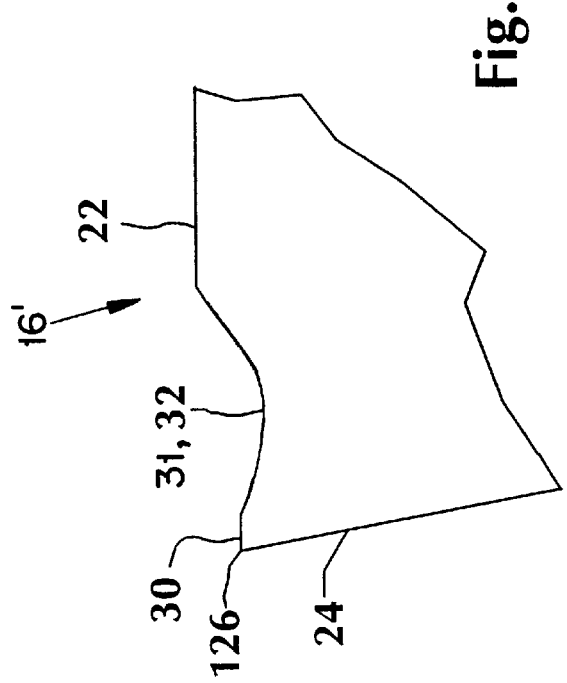
Fig. 10
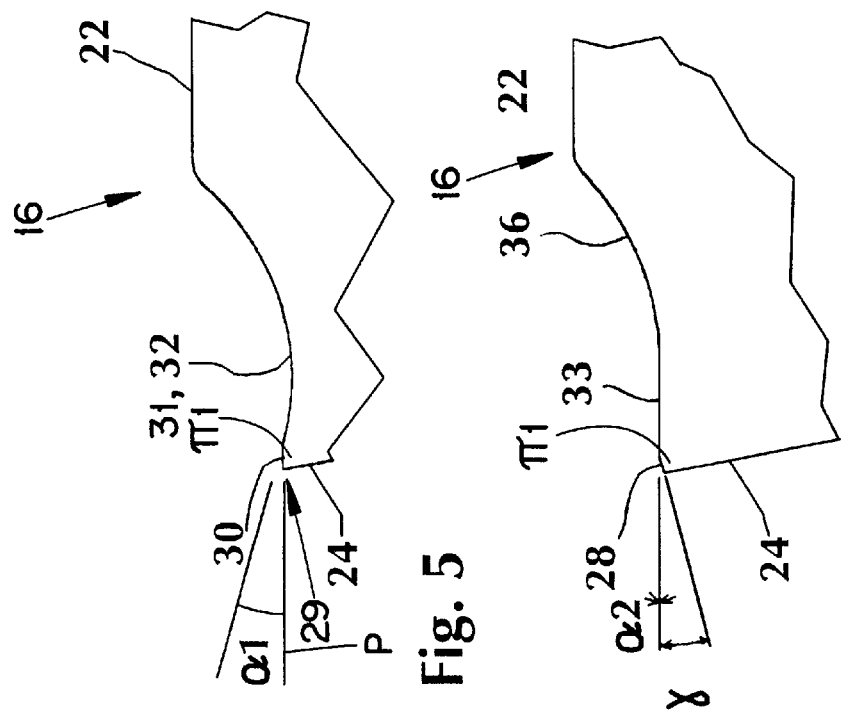
Fig. 5
Fig. 6

DRILL HAVING RADIALLY OVERLAPPING INDEXABLE CUTTING INSERTS

BACKGROUND

The present invention relates to a drill for drilling metallic workpieces, as well as a cutting insert to be used in connection with the drill.

PRIOR ART

In a known drill of the above-mentioned type the drill has square indexable inserts, namely, a central insert and a peripheral insert of identical design. The central insert overlaps the axis of rotation of the drill and the peripheral insert overlaps the central insert. Each corner portion of the central insert comprises a chamfer which in the operative (cutting) position of the insert is arranged to overlap the rotational axis. After indexing of the central insert that same chamfer gets relocated to another position which may still constitute an operative position, whereby the cutting insert does not cut as light as a new cutting insert. This means that the cutting insert actually only can give two non-worn cutting edges per cutting insert, which is uneconomical.

OBJECTS OF THE PRESENT INVENTION

One object of the present invention is to provide a drill, a cutting insert of which has four cutting edges, where worn portions do not endanger indexing into other operative positions.

Another object of the present invention is to provide a light cutting insert with four cutting edges.

SUMMARY OF THE INVENTION

The above objects are achieved by the present invention relates to a drill comprising a shank, a central insert, and a peripheral insert. The shank defines a central axis of rotation and has a central pocket receiving the central insert, and a peripheral pocket receiving the peripheral insert. Chip flutes extend rearwardly in an outer periphery of the shank from respective ones of the pockets for conducting chips cut by the central and peripheral inserts, respectively. The peripheral insert includes a first operative cutting edge projecting laterally outwardly beyond the shank to form a diameter of a hole cut by the drill. The central insert is substantially square and includes a second operative cutting edge overlapping the first operative cutting edge at an overlap region spaced radially from the axis of rotation. The second operative cutting edge extends inwardly past the axis of rotation. The central insert forms a rake surface adjacent to the second cutting edge. The rake surface includes a first portion disposed at the axis of rotation and a second portion disposed at the overlap region. The second portion has a larger rake angle than the first portion.

The invention also relates to a cutting insert adapted for use in a drill. The insert comprises a body of substantially square shape. The body has upper and lower parallel generally planar surfaces, and side surfaces interconnecting the upper and lower surfaces. Intersections of the upper surface and the side surfaces form cutting edges. The lower surface has a smaller cross sectional area than the upper surface, whereby the insert has a positive cutting geometry. The body defines four corners each having a bisector. The corners form parts of the cutting edges, and each corner has a rake surface, wherein a portion of the rake surface disposed on one side of a respective bisector has a larger rake angle than a portion of the rake surface disposed on the other side of that same bisector.

BRIEF DESCRIPTION OF THE DRAWINGS

The invention is more closely described below in connection with subsequent drawings, wherein:

FIGS. 5 and 6 show cross sections according to the lines V—V and VI—VI, respectively in FIG. 3;

FIGS. 9 and 10 show cross-sections according to the lines IX—IX and X—X, respectively in FIG. 7, and FIG. 11 schematically shows the overlap of the central and peripheral inserts.

DETAILED DESCRIPTION OF PREFERRED EMBODIMENTS OF THE INVENTION

Figure 1:
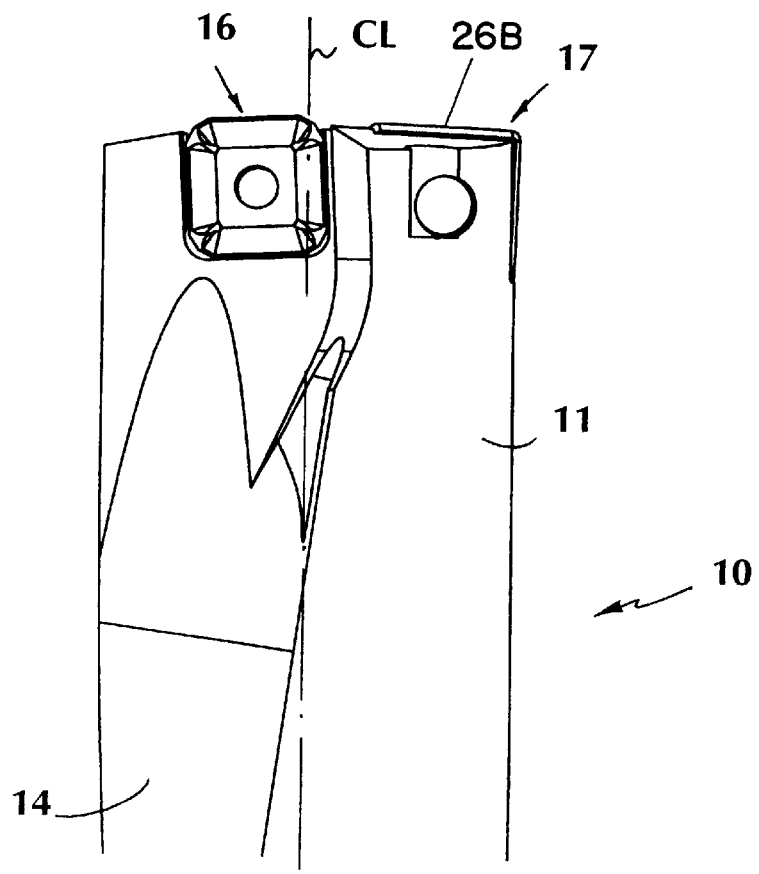
FIG. 1 shows a side view of a working end of a drill according to the present invention.
Figure 2:
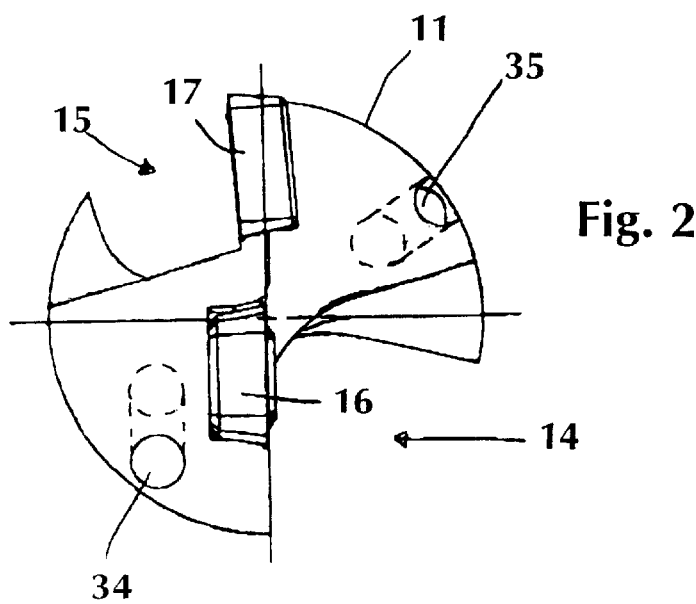
FIG. 2 shows a top view of the working end surface.
Figure 4:
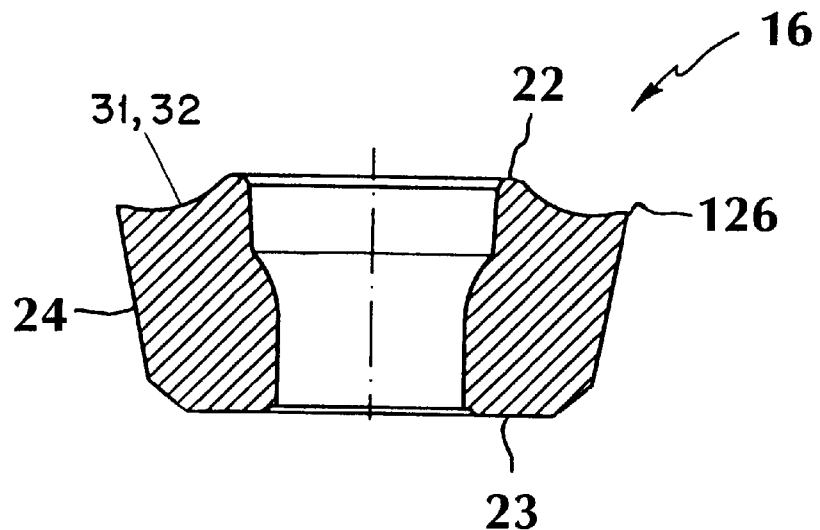
FIG. 4 shows a cross section according to the line IV—IV in FIG. 3.

FIGS. 1 and 2 show a cylindrical drill shank 11 that is provided with two insert pockets at its forward end, the insert pockets located on respective sides of the center line CL (axis of rotation) of the drill. Helical recesses or chip flutes 14, 15 are provided for chip transport. Both insert pockets are provided with central holes for receiving locking screws (not shown) for clamping cutting inserts in the pockets in a known manner. The pockets comprise a central pocket which is provided radially inside the periphery of the drill shank 11, and a peripheral pocket which terminates in the outer cylindrical periphery of the drill shank. The insert pockets are designed in the drill shank 11 in a manner such that they possess different axial clearance angles and, together with the cutting inserts, achieve full drilling of the entire hole diameter.

Each cutting insert pocket comprises a tangential support surface, an axial support surface as well as a radial support surface. The support surfaces are designed for cutting inserts with positive cutting geometry. The tangential support surface is substantially parallel with a radial plane through the center line CL.

The central pocket is provided to receive a central insert 16, the operative edge 26A of which protrudes in the axial direction relative to the associated pocket in order to cut centrally located material.

The peripheral pocket receives a square peripheral insert 17, the operative edge 26B of which protrudes relative to the drill shank in the radial direction such that the hole diameter of the drill is determined thereby. The peripheral pocket and the peripheral insert 16 are inclined relative to the center line CL of the drill shank 11 an acute angle δ of about 2 to 3° (see FIG. 11) for obtaining requisite clearance for the peripheral insert.

Furthermore, the drill shank 11 is provided with a number of channels 34, 35, which transfer flushing medium to the cutting area for the removal of cut chips via the chip flutes 14, 15.

FIGS. 3 to 6 show an indexable insert 16 for use in the above-described central pocket of the drill shank. The cutting insert 16 has a substantially square basic shape including an upper planar major surface 22 and a lower planar major surface 23, which are substantially parallel to each other. The major surfaces 22, 23 are connected by side surfaces 24, which are substantially equally long. The lower major surface 23 is smaller than the upper major surface 22, and therefore the cutting insert obtains a positive clearance angle. The lines of intersection of the side surfaces 24 with the upper planar surface 22 form four major edges 26, whereof only one edge 26A is operative at a time and machines the work piece during a drilling operation.

A bisector B at each corner portion 27 of the central insert is defined by a diagonal line passing through a center C of the insert and a point of intersection I of imaginary lines of extension for the associated main cutting edges 26. Each major cutting edge 26 comprises a first chamfer edge 28, a second chamfer edge 29 and an intermediate edge 126. In the vicinity of one end of the major cutting edge 26 the first chamfer edge 28 connects to the intermediate edge 126 which in its turn connects to the second chamfer edge 29 in the vicinity of the other end of the major cutting edge 26. The first chamfer edge 28 forms a first acute angle β1 with the preferably straight, intermediate edge 126, and the second chamfer edge 29 forms a second acute angle β2 with the intermediate edge 126. The first acute angle β1 is about 25° and the second acute angle β2 is also about 25°. The chamfer edges 28 and 29 of adjacent major cutting edges 26 intersect in or in the vicinity of the bisector B. A reinforcing chamfer 30 extends around the outer periphery of the insert. The inner angle between the edge surface 24 and a reinforcing chamfer 30, connected to the major cutting edge 26, is called an edge angle. The edge angle π2 formed along the intermediate cutting edge 126 and along the second chamfer edge 29 (see FIG. 5) is less than the edge angle π1 formed along the first chamfer edge 28, (see FIG. 6). The reason for providing differing edge angles on the chamfer edges 28 and 29 is that the first chamfer edge 28 during drilling will have no (or slow) cutting speed since this edge 28 overlaps the rotational axis CL (see FIG. 11). Thus, the strength of the chamfer edge 28 becomes better if its edge angle π1 is relatively large, i.e. if it is blunt and lies within the interval of 91–110°, preferably about 94°. Stated in another way, the chamfer edge and reinforcing chamfer 30 form a negative angle Y (FIG. 6) with a plane p1 which contains the intermediate edges 126, said angle being about 15°. The second chamfer edge 29, like the intermediate edge 126, shall work at higher cutting velocity than the first chamfer edge and need not be strengthened by chamfers, and therefor its cutting edge angle π2 is acute, i.e., it is less than 90° but bigger than 75°. The intermediate edge 126 is preferably straight, but alternatively could be somewhat convexly or concavely discontinuous.

A first rake surface 31 connects to the radially inner edge of the strengthening chamfer 30 of the intermediate edge 126 and the second chamfer edge 29, which rake surface 31 is formed for chip breaking and has the shape of a groove 32. Upstanding projections (not shown) could be formed on the surface of the groove, or recesses could be formed in that surface, to aid in chip control. The groove 32 has marked lines of intersection with adjacent surfaces.

The rake surface 31 forms a rake angle α1 with a plane P which contains the strengthening chamfers 30, the plane extending perpendicular to the surface of the workpiece, not shown. The rake angle α1 lies within the range of 5 to 20°. The groove 32 further connects to the upper planar surface 22.

A second rake surface 33 connects to the first chamfer edge 28, which rake surface 33 has the shape of a substantially planar surface. The second rake surface 33 forms a rake angle α2, which is about 0°, for reinforcing the corner portion. The second rake surface 33 further connects to the upper planar surface 22 via a concave ridge 36.

As a result of the above-described structure, the rake angle is neutral where the cutting edge needs strength and positive where the cutting edge needs to cut easily. This is obtained by raising the second rake surface 33 at the corner portion 27 in relation to the first rake surface 31 along the edges 126 and 29.

In other words the rake angle for the operative edge 26A of the substantially square central insert 16 larger on one side of the bisector B than on the other side of the bisector. It should however be observed that two adjacent chamfer edges 28, 29 are not intended to cut material simultaneously, but rather the chamfer edge 28 during drilling cooperates with the associated intermediate edge 126 as well as with a second chamfer edge 29 at an adjacent corner portion 27.

Figure 3:
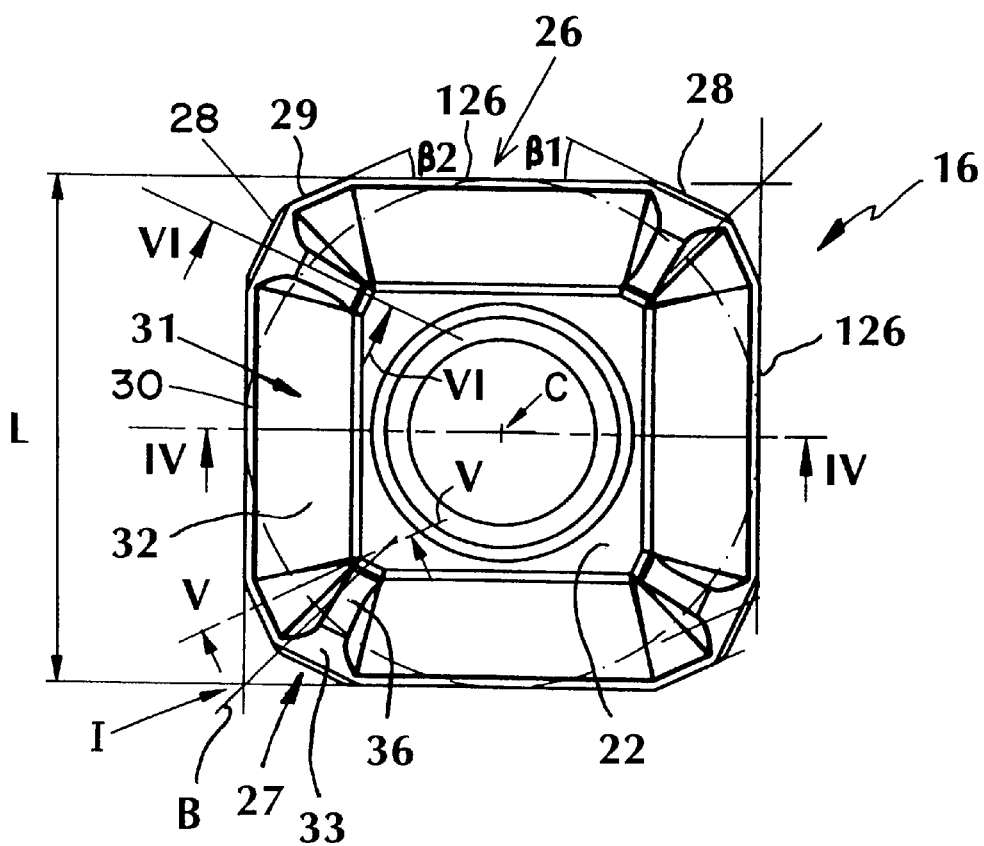
FIG. 3 shows a plan view of a cutting insert according to the present invention.
Figure 8:
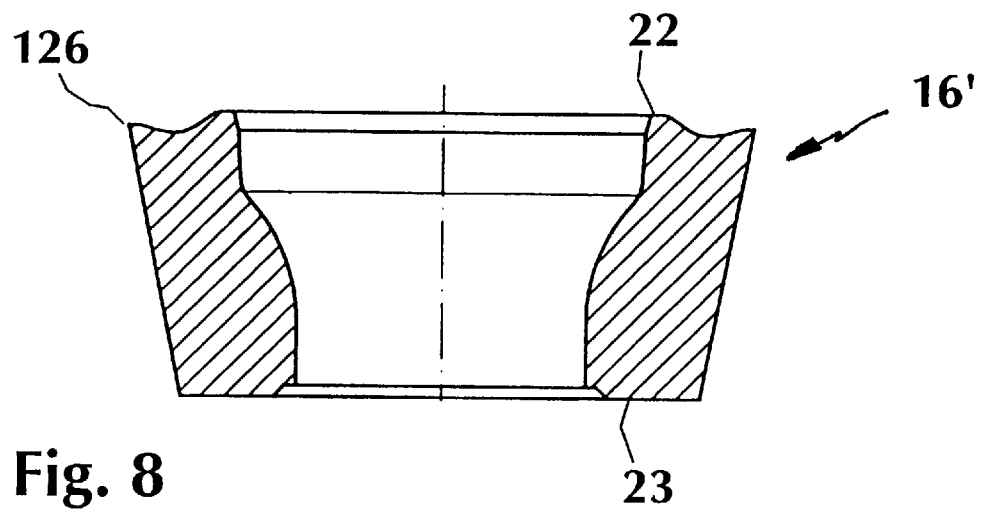
FIG. 8 shows a cross-section according to the line VIII—VIII in FIG. 7—7.
Figure 7:
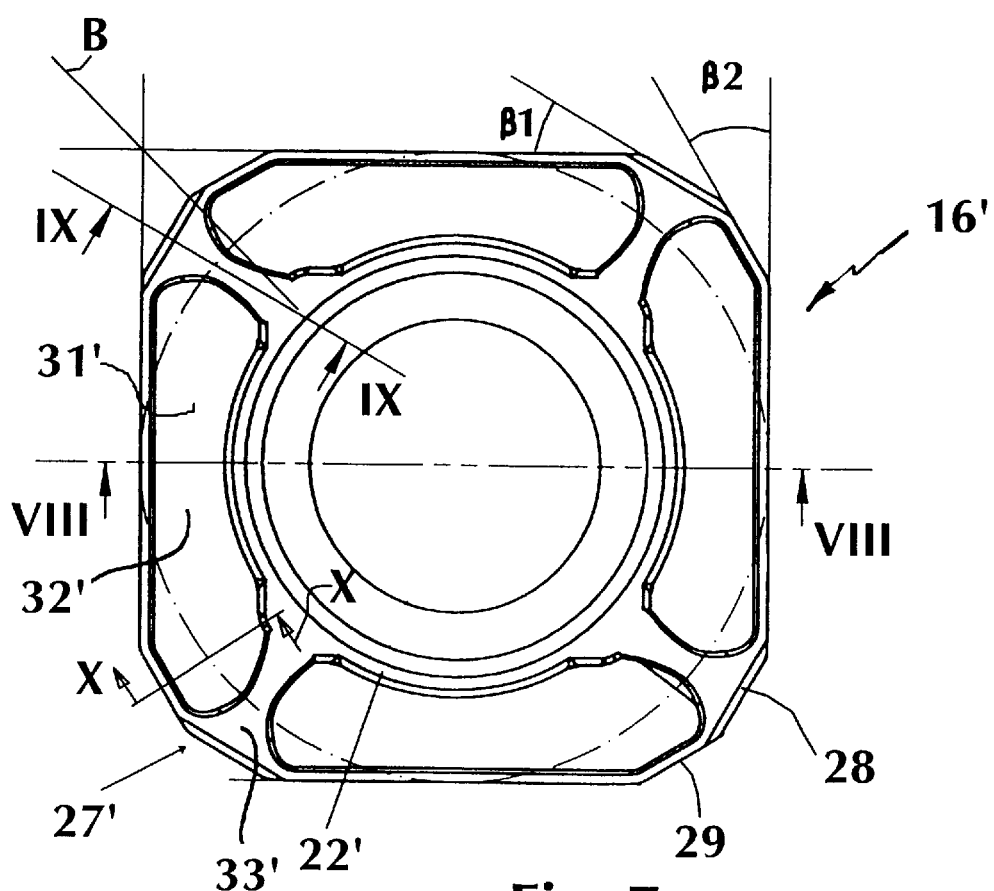
FIG. 7 shows a plan view of an alternative cutting insert according to the present invention.

The length L of the cutting insert 16, which is defined by the distance between two parallel intermediate edges 126, is about 8 mm for the cutting insert in FIG. 3.

In FIGS. 7–10 is shown an alternative cutting insert 16' according to the present invention where the same details are numbered as above. The cutting insert 16' is adapted for smaller dimensions, where the distance L is about 6 mm and the insert is thinner. What differentiates the cutting insert 16' from the earlier described cutting insert is partly that the rake surface 33' connects in the same plane to the upper the planar surface 22 and that the groove 32' lacks marked lines of intersection. Furthermore, the first acute angle β1 is here about 30° and the second acute angle β2 is about 30°.

Figure 11:
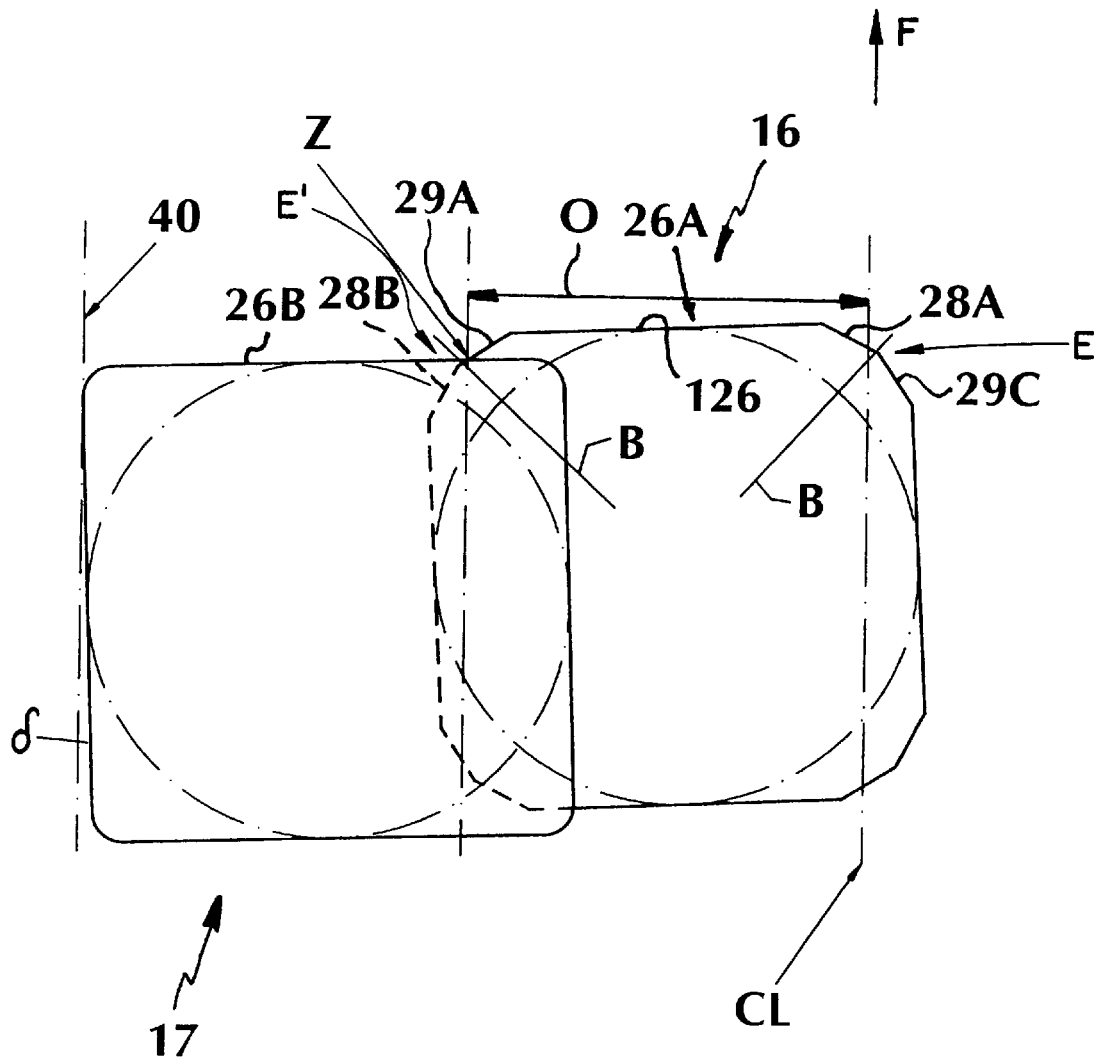

With reference to FIGS. 1, 2 and 11 the function of the drill shall be described. The cutting inserts 16 and 17 are provided at each side of the center line CL of the drill and are spaced apart by about 180°. The operative major edges 26A and 26B cooperate in order to cut chips from a work piece forming a hole 40 which is somewhat larger than the diameter of the drill shank 11 while side surfaces 24 of their non-operative major edges bear against the axial and radial support surfaces of the pockets. In FIG. 11 it is schematically shown how the cutting inserts divide the cutting work at one side of the rotational axis CL. The central insert 16 or 16' is positioned in the central pocket less than a millimeter axially short of the peripheral insert 17 in the feed direction F. The intermediate edge 126 forms an acute angle with the rotational axis CL. This gives the drill a geometry which fits for a so called stack drilling operation. The cutting insert 16 may alternatively be angled such that it forms an obtuse angle with the rotational axis. The first (strong) chamfer edge 28A of the central insert is provided in and in the vicinity of the rotational axis, where the cutting speed is low. The peripheral insert 17 is provided such that its operative edge 26B during drilling will overlap the second chamfer edge 29 of the central insert at an overlapping region or point Z at a distance O from the rotational axis. The central insert and the peripheral insert are provided in the drill body such that the bisectors B for the two operative corners of the center insert 16 will intersect the outer periphery of the center insert at points E, E' located radially past the rotational axis CL and the overlap region Z. This means that the heavily cutting chamfer edge 28B on the other side of the bisector (to the left in the figure) will be covered or "shadowed" by the edge 26B of the peripheral insert. That is, the chamfer edge 28B, which is distant from the rotational axis, never comes into engagement with the work piece since the cutting edge 26B takes care of that cutting work. During drilling that means that the drill can work with relatively small energy consumption and that the more peripheral part of the rake surface 31 can be provided with chip formers which do not need to be adapted for low cutting speed. The rake surface 31 forms well-shaped chips which can be flushed away via the preferably helically shaped chip flute 14. The peripheral insert 17 will machine with relative high cutting speed and should thereby have a positive rake angle for diminishing the heat development and thereby attain a good life-span for the cutting insert. The second chamfer edge 29C next to the chamfer edge 28A will be hidden in the "shadow" of the cutting edge 28A due to the cutting edge 29c being provided axially rearwardly of the cutting edge 28A as well as on opposite side of the rotational axis. The rotational axis intersects the chamfer edge 28A at or in the vicinity of the bisector B.

A central cutting insert 16 with the shown shape provides four cutting edges, each comprised of edges 28A, 126 and 29A. When the insert 16 is indexed the new set of edges 28A, 126, 29A will not have been affected by the previous (e.g., pre-indexing) drilling operation.

The cutting insert 16, 16' is made of hard material, preferably of cemented carbide such as sintered tungsten carbide.

The present invention consequently relates to a drill and a cutting insert therefore, wherein the cutting insert is developed such that it makes the drill light cutting and economical. The cutting insert is further developed for giving four cutting edges.

Although the present invention has been described in connection with preferred embodiments thereof, it will be appreciated by those skilled in the art that additions, deletions, modifications, and substitutions not specifically described may be made without departing from the spirit of the invention as defined in the appended claims.

What is claimed is:

1. A drill comprising a shank, a central insert, and a peripheral insert;
   the shank defining a central axis of rotation and having a central pocket receiving the central insert, a peripheral pocket receiving the peripheral insert, a pair of chip flutes extending rearwardly in an outer periphery of the shank from respective ones of the pockets for conducting chips cut by the central and peripheral inserts, respectively;
   the peripheral insert including a first operative cutting edge projecting laterally outwardly beyond the shank to form a diameter of a hole cut by the drill;
   the central insert being substantially square and including a second operative cutting edge overlapping the first operative cutting edge at an overlap region spaced radially from the axis of rotation, the second operative cutting edge extending inwardly past the axis of rotation, the central insert forming a rake surface adjacent to the second cutting edge, the rake surface including a first portion disposed at the axis of rotation and a second portion disposed at the overlap region, the second portion having a larger rake angle than the first portion.

2. The drill according to claim 1 wherein the central insert includes four corners, each corner including a pair of first and second chamfers; the central insert arranged such that an inner pair of chamfers is located adjacent the axis of rotation, and an outer pair of chamfers is located adjacent the overlap region; the axis of rotation intersecting the first chamfer of the inner pair, and the overlap region being defined by the second chamfer of the outer pair; the first chamfer of the outer pair lying in the shadow of the peripheral insert.

3. The drill according to claim 1 wherein the peripheral insert has a different geometry than the central insert, each of the inserts having a plurality of corners each corner having an imaginary bisector; the central insert arranged such that the bisector of each corner intersects an outer periphery of the central insert at a location always disposed radially outside of both the axis of rotation and the overlap region.

4. A cutting insert adapted for use in a drill, comprising a body of substantially square shape; the body having upper and lower parallel generally planar surfaces, and side surfaces interconnecting the upper and lower surfaces; intersections of the upper surface and the side surfaces forming cutting edges; the lower surface having a smaller cross sectional area than the upper surface, whereby the insert has a positive cutting geometry; the body defining four corners each having a bisector, the corners forming parts of the cutting edges, and each corner having a rake surface; wherein a portion of the rake surface disposed on one side of a respective bisector has a larger rake angle than a portion of the rake surface disposed on the other side of that same bisector.

5. The cutting insert according to claim 4 wherein each corner is formed by first and second chamfers separated by the bisector, the first and second chamfers having the first and second rake surfaces, respectively.

6. The cutting insert according to claim 5 wherein adjacent pairs of the corners are intersected by a generally straight intermediate cutting edge, the first and second chamfers at each corner forming first and second acute angles with a respective ones of the intermediate cutting edges.

7. The cutting insert according to claim 6 wherein the first and second acute angles are substantially equal.

8. The cutting insert according to claim 7 wherein the body forms a groove-shaped rake surface adjacent each of the intermediate cutting edges, each intermediate cutting edge being connected to its respective groove-shaped rake surface by a strengthening chamfer.

* * * * *